United States Patent [19]

Basehore

[11] Patent Number: 5,046,019

[45] Date of Patent: Sep. 3, 1991

[54] FUZZY DATA COMPARATOR WITH NEURAL NETWORK POSTPROCESSOR

[75] Inventor: Paul M. Basehore, Sanford, Fla.

[73] Assignee: Chip Supply, Inc., Orlando, Fla.

[21] Appl. No.: 421,019

[22] Filed: Oct. 13, 1989

[51] Int. Cl.[5] ............................................. G06F 15/18
[52] U.S. Cl. .................................... 364/513; 371/5.5; 365/49
[58] Field of Search ............................ 364/513, 900; 340/146.3; 235/153; 365/49

[56] References Cited

U.S. PATENT DOCUMENTS

| 3,700,870 | 10/1972 | Howell | 235/153 |
|---|---|---|---|
| 4,084,260 | 4/1978 | Fleming et al. | 364/900 |
| 4,119,946 | 10/1978 | Taylor | 340/146.3 |
| 4,897,814 | 11/1990 | Clark | 365/49 |
| 4,975,961 | 12/1990 | Sakoe | 381/43 |

FOREIGN PATENT DOCUMENTS 1427519 3/1976 United Kingdom.

OTHER PUBLICATIONS

Lippmann; Richard P., "An Introduction to Computing with Neural Nets", *IEEE ASSP Magazine*, Apr. 1987, pp. 4-21.

Tacker et al., "A Fuzzy Logic/Neural System Approach to Signal Processing in Large Scale Decision Systems".

Caudill, "Using Neural Nets: Fuzzy Decisions", *AI Expert*, Apr. 1990, pp. 59-60.

*Primary Examiner*—Allen R. MacDonald
*Assistant Examiner*—Roger S. Joyner
*Attorney, Agent, or Firm*—Duckworth, Allen, Dyer & Doppelt

[57] ABSTRACT

A fuzzy data comparator receives a fuzzy data digital data bit stream and compares each frame thereof with multiple sets of differing known data stored in a plurality of pattern memories, using a selected comparison metric. The results of the comparisons are accumulated as error values. A first neural postprocessing network ranks error values less than a preselected threshold. A second neural network receives the first neural network solutions and provides an expansion bus for interconnecting to additional comparators.

9 Claims, 4 Drawing Sheets

FUZZY DATA COMPARATOR WITH NEURAL NETWORK POSTPROCESSOR

BACKGROUND OF THE INVENTION

1. Field of the Invention

The present invention relates to systems for evaluating noisy data, and more particularly to a system for accepting fuzzy data and processing such data to make optimum decisions as to each element of the noisy data.

2. Description of the Prior Art

There are many sources of digital data transmitted through various media in which the received data is rendered inaccurate due to noisy channels, interference, and the like. Such data may come from optical, speech, telemetry, and judgmental sources. These contaminated data are difficult to use directly in decision making or pattern recognition applications. Data of this type is referred to as "fuzzy" data and the process of making an optimum decision for each data element is known as "defuzzification". The defuzzification of data has been done in the prior art by single index ranking[1]. However, this technique may result in reduced resolution and loss of potentially vital information. Another approach is multiple index ranking[2]. This technique is in early stages of development and is not presently available for practical application.

One approach to this problem may use modified single index ranking and is preferably implemented with neural networks.

SUMMARY OF THE INVENTION

The present invention provides a more efficient approach to defuzzification of data then previous available, and utilizes a much simpler hardware implementation and a greater rank calculation speed than previously available.

A fuzzy set comparator, designed for adaptive ranking, is provided which ranks fuzzy data in groups by certain predetermined characteristics, utilizing a modified single index ranking. A comparator may use either Hamming or linear distance selectively as the comparison metric. The fuzzy set comparator includes a fuzzy data comparator that drives a neural network postprocessor which ranks the comparisons. The fuzzy set comparison system accomplishes limited "learning" by allowing input data streams representative of known patterns to be stored in memory for subsequent use as comparison data.

The system may be implemented in 1.5 micron or higher speed CMOS technology. It is bus oriented and may be incorporated into a microprocessor environment, or operated autonomously. Among the many applications of the invention are: text, video and voice recognition; robotic control; security; surveillance; and computer aided manufacturing (CAM) systems. The system permits high data throughput, and high speed processing. The architecture of the fuzzy set comparator provides for expansion as required. For most applications, the fuzzy set comparator does not require preprocessing circuitry before performing the fuzzy ranking.

The fuzzy set comparator may be configured to have a desired number of learned data sets required for the particular application. In one embodiment, the fuzzy data comparator is composed of eight fuzzy data comparison circuits, two neural networks in tandem, and circuitry to perform overhead functions. Each comparison circuit compares a fuzzy data set with a previously learned data set. Each comparison circuit generates an error value, using one of two externally selectable comparison matrices. Once obtained, the error values are passed on to the neutral networks.

The ranking postprocessor is configured as two tandem neural networks. The first neural network provides a result of the comparison of the incoming data with each of the learned data sets. The second neural network provides for expansion to other fuzzy set comparator devices. The action of the fuzzy set comparator is based on an application of fuzzy logic and mathematics[3]. Fuzzy logic may be thought of as a generalization of basic Boolean concepts, and the algebra of fuzzy sets degenerates to Boolean algebra when the fuzzy sets are replaced with well defined sets of Boolean logic.

It is therefore a principal object of the invention to provide a fuzzy set comparator having adaptive ranking capability for ranking fuzzy data in groups by certain predetermined characteristics, and thereafter ranking the comparisons in a neural network.

It is another object of the invention to provide a device for defuzzification of fuzzy data that is bus oriented and that may be incorporated into a microprocessor environment or operated autonomously.

It is still another object of the invention to provide a fuzzy set comparator which utilizes a modified single index ranking technique.

It is yet another object of the invention to provide a fuzzy data comparator followed by a tandem pair of neural networks having high data throughput, high speed processing, and expansion capabilities.

It is a further object of the invention to provide "learning" of input data being compared against previously stored data in pattern rams by storing the input data in other pattern rams.

These and other objects and advantages of the invention will become apparent from the following detailed description when read in conjunction with the drawings.

DETAILED DESCRIPTION OF THE PREFERRED EMBODIMENT

Figure 1:
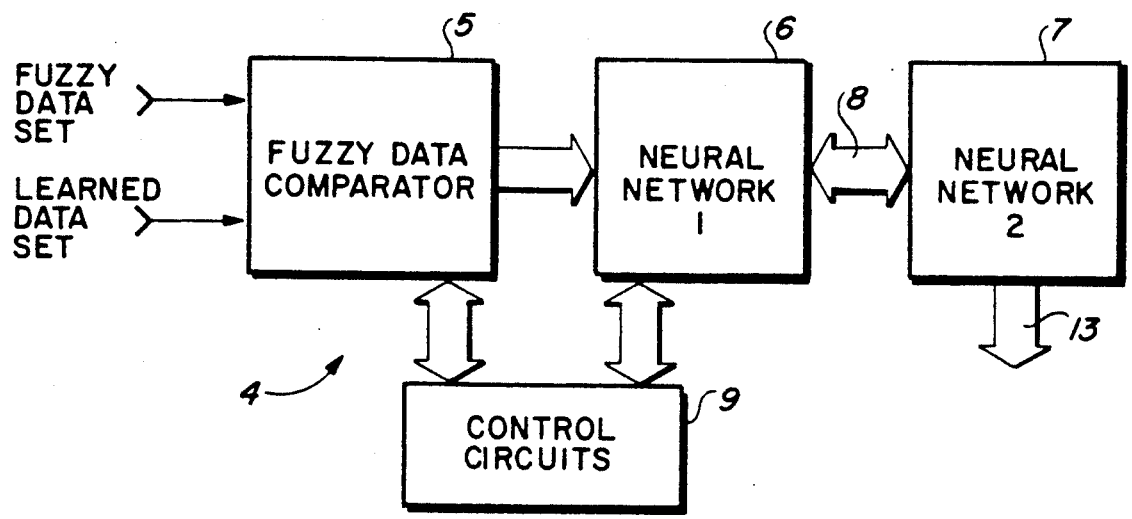
FIG. 1 is a simplified block diagram of a typical system in accordance with the invention.

Referring to FIG. 1, a simplified block diagram of a basic fuzzy set comparator 4 of the invention is shown. A fuzzy data comparator 5 is composed of eight data comparison circuits and has a first input to receive the fuzzy data set and a second input for a learned data set. The operation of the fuzzy data comparator is controlled by control circuits 9.

Each comparison circuit of fuzzy data comparator 5 utilizes one of two externally selectable comparison matrices to generate error values by comparing a fuzzy data set with stored, learned data sets. The serial digital fuzzy data is formatted into bit fields and compared, one field at a time, with eight learned data sets.

The error values thus obtained are passed to neural networks 6 and 7 which are in tandem. The combination of first neural network 6 in tandem with second neural network 7 provides a ranking postprocessor. First neural network 6 receives inputs from each of the eight data comparison circuits of fuzzy data comparator 5 and a threshold or ranking value from control circuits 9. Control circuits 9 furnish a clock to the comparators and the neural networks. First neural network 6 settles on the lowest value of nine 16-bit inputs in two clock periods. During the first clock time, the high bytes of the nine inputs are compared and the low bytes are compared during the second clock period. The first neural network solution appears on bus 8. If more than one comparison error occurs in the ranking values, these errors are compared on the expansion bus which forms a part of the second neural network 7. Arbitration circuitry is provided to handle tie conditions and consumes one additional clock period. Thus, the solution is reached within five clock periods from the time data initially input to the first neural network and appears on output bus 13.

Figure 2:
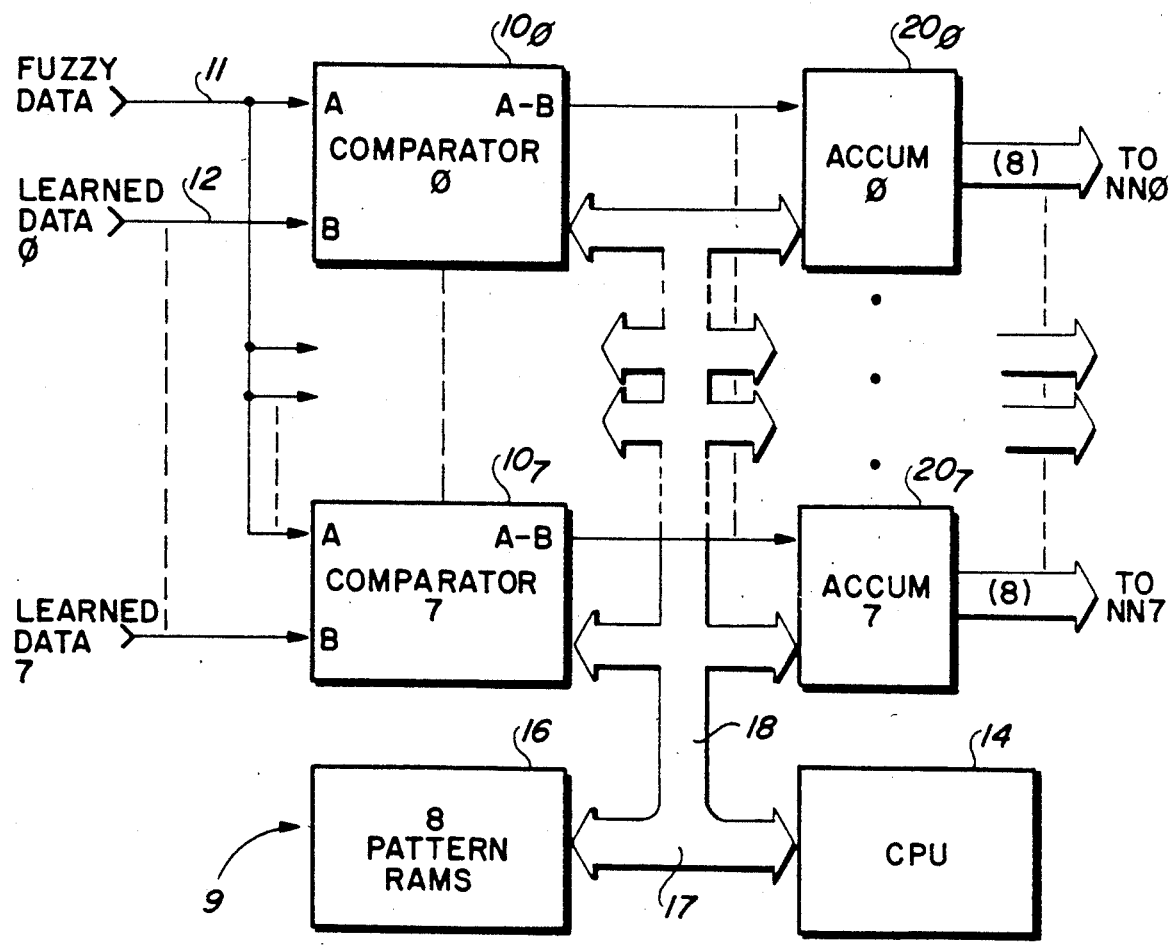
FIG. 2 is a block diagram of the fuzzy data comparator of FIG. 1.

Details of the construction of the fuzzy data comparator 5 are shown in the block diagram of FIG. 2. As will be noted, control circuits 9 includes and a set of eight pattern RAMs 16 connected by internal bus 17. CPU 14 controls a set of eight comparators $10_0$ to $10_7$ via bus 18, each having an A input and a B input. Prior to operation of the system, known serially entered data are input on leads 12 to each of the B inputs of comparators 10. These data are stored by CPU 14 in the eight pattern rams 16. Serial fuzzy data, representative of the stored learned data, are entered on lead 11 to input A of comparators 10 in parallel. One unknown data input can thus be compared with up to eight known pattern inputs. The data input is serial and formatted into bit fields and compared, one field at a time, with the data stored in external pattern memories 16. The result is an accumulation of errors from each of the fields which have been compared. The accumulation of errors represents a closeness value. The closeness value of a particular comparison is compared to a programmed threshold value, provided by CPU 14. If the closeness value is less than the threshold value, a match is found.

The result of the comparison of each bit field by each comparator 10 appears at the A-B output. The result represents the distance for one field. If the field length is set to one bit, the output is a Hamming distance; lengths greater than one bit result in a linear distance measure. The A-B output is fed to an accumulator 20 for each comparator 10. Thus, each comparator $20_0$ to $20_7$ accumulates the errors from the respective comparators which are input to neural networks 6 and 7. Each neural network 6 has eight inputs from each accumulator 20.

Figure 4:
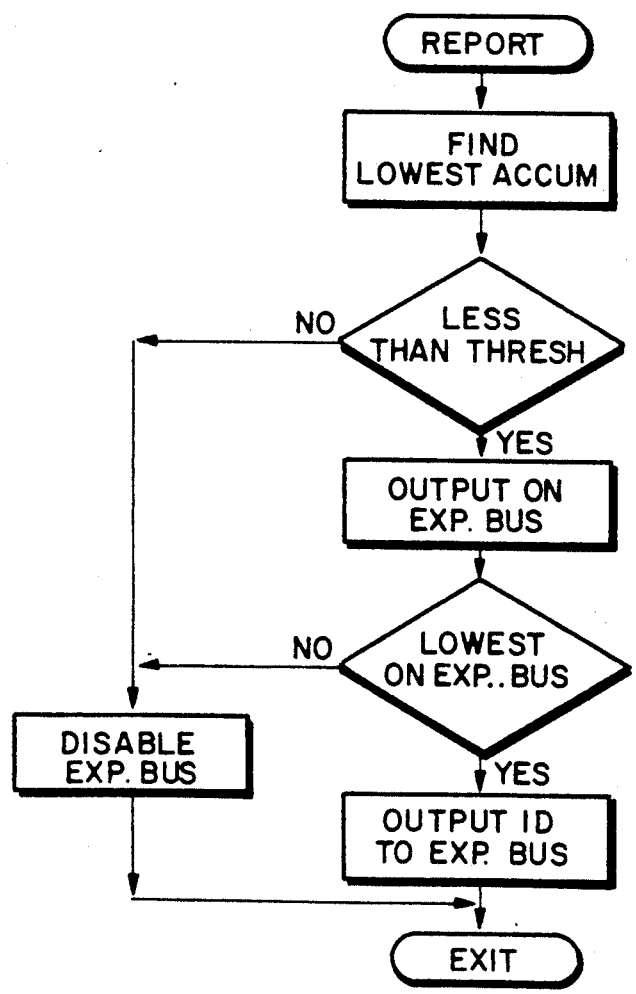
FIG. 4 is a flow diagram of the report mode of the system.

The serial input data and compare operation in fuzzy data comparator 5 involves four internal operating modes. A first mode occurs at the end of each frame and reports the results of the comparisons in that frame. FIG. 4 provides a flow diagram of this mode. The neural network finds the lowest value in accumulators 20 and this value is required to be less than the stored threshold. If it is not, the expansion bus is disabled. If a value less than the threshold is found, the value is output on expansion bus 8 and compared to other values of that field on the expansion bus. If it is the lowest value on the bus, an output ID from CPU 14 is placed on the expansion bus to identify the decision. If not, the expansion bus is disabled.

In a second mode, the serial data to be compared is entered. The third mode is a reset to prepare for new data, and the fourth mode is a wait mode for data synchronization and framing.

Figure 3:
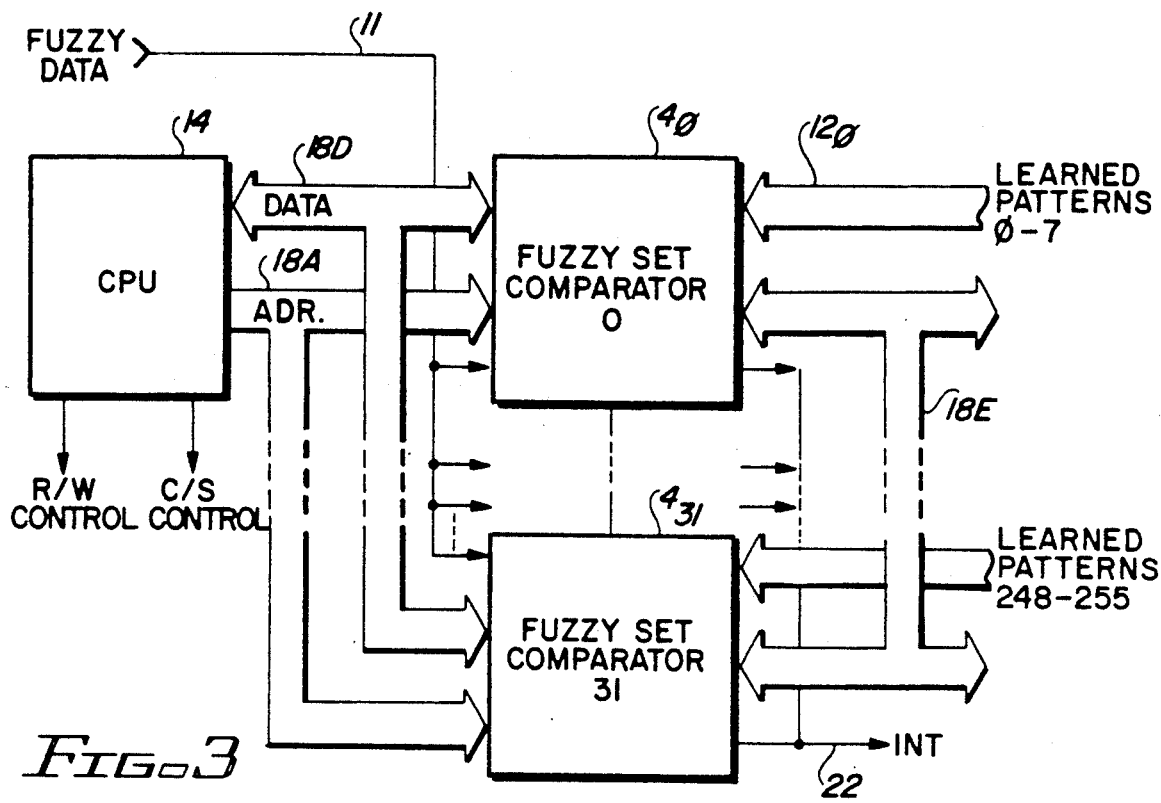
FIG. 3 is a block diagram of the architecture of the system showing the use of an expansion bus to increase the capacity of the system.

FIG. 3 is a block diagram illustrating the bus orientation of the fuzzy set comparator 4 of the invention, and illustrates the expansion bus which permit additional fuzzy set comparators 4 to be used. For example, 32 fuzzy set comparators may be used in the preferred embodiment as indicated by fuzzy set comparators $4_0$ to $4_{31}$. The solutions from the neural network from each of the neural networks in the fuzzy set comparators 4 are delivered by expansion bus 18E to CPU 14. As will be noted, 256 learned patterns may be fed to a like number of pattern RAMS in CPU 14. Thus, the output from as many as 32 fuzzy set comparator devices settles on the lowest of the up to 256 total inputs within five clock periods. Any single accumulator or control register from any fuzzy set comparator 4 is addressable through a 4 bit address bus 18A and a chip select (C/S) control signal from the CPU 14. Data may be moved to and from an accumulator 20 and memory register 16 via the data bus 18D and the read/write (R/W) control signal. In an expanded system such as shown in FIG. 3, the "winner" or expansion bus result can be read via the data bus from any of the FSCs 4, not only from the winning FSC. Certain device operation conditions and alarms may be controlled via an interrupt signal on lead 22.

Figure 5:
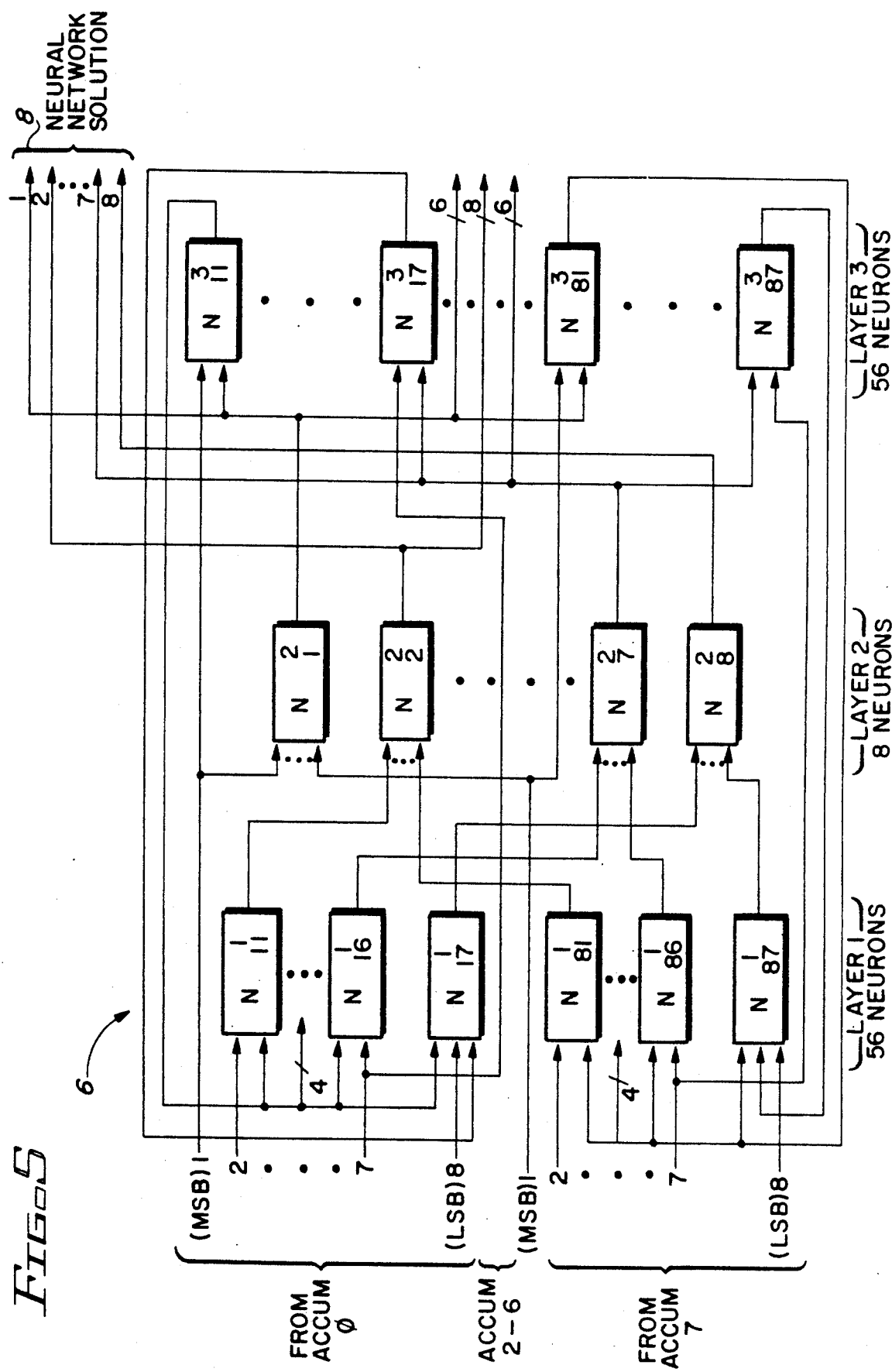
FIG. 5 is a simplified block diagram of the first neural network of FIG. 1 showing the network output solution.

Having discussed the overall system, the neural network portion will be described with reference to the simplified block diagrams of FIG. 5 and 6. As disclosed by Hopfield[4] and Woodrow[5], a logic element is a limiting form of a neuron. As shown in FIG. 5, the invention utilizes a three layer asynchronous competitive neural network formed from simple logic elements $N_{1-11}$ through $N_{1-87}$; $N_{2-1}$ through $N_{2-8}$; and $N_{3-11}$ through $N_{3-87}$. Layer 1 contains 56 neurons. The outputs from accumulator $20_0$ is shown connected to the eight neurons $N_{11}$ to $N_{17}$, and the outputs from accumulator $20_7$ connected to neurons $N_{81}$ to $N_{87}$. Layer 2 has eight neurons, one for each of the eight accumulators, while layer 3 has 56 neurons. The network shown will solve the problem of identifying the lowest 8 bit value from up to eight error accumulators, available as the neural network solution on bus 8.

Information from the accumulators feeds forward through network 6, while feedback from layer 3 to layer 1 provides reinforcement or inhibition of the input data, as appropriate. Some feed forward of the input data directly to layer 3 also occurs. The lowest 16 bit word from among all the accumulators in a particular fuzzy set comparator eventually settles at the layer 2 output.

Figure 6:
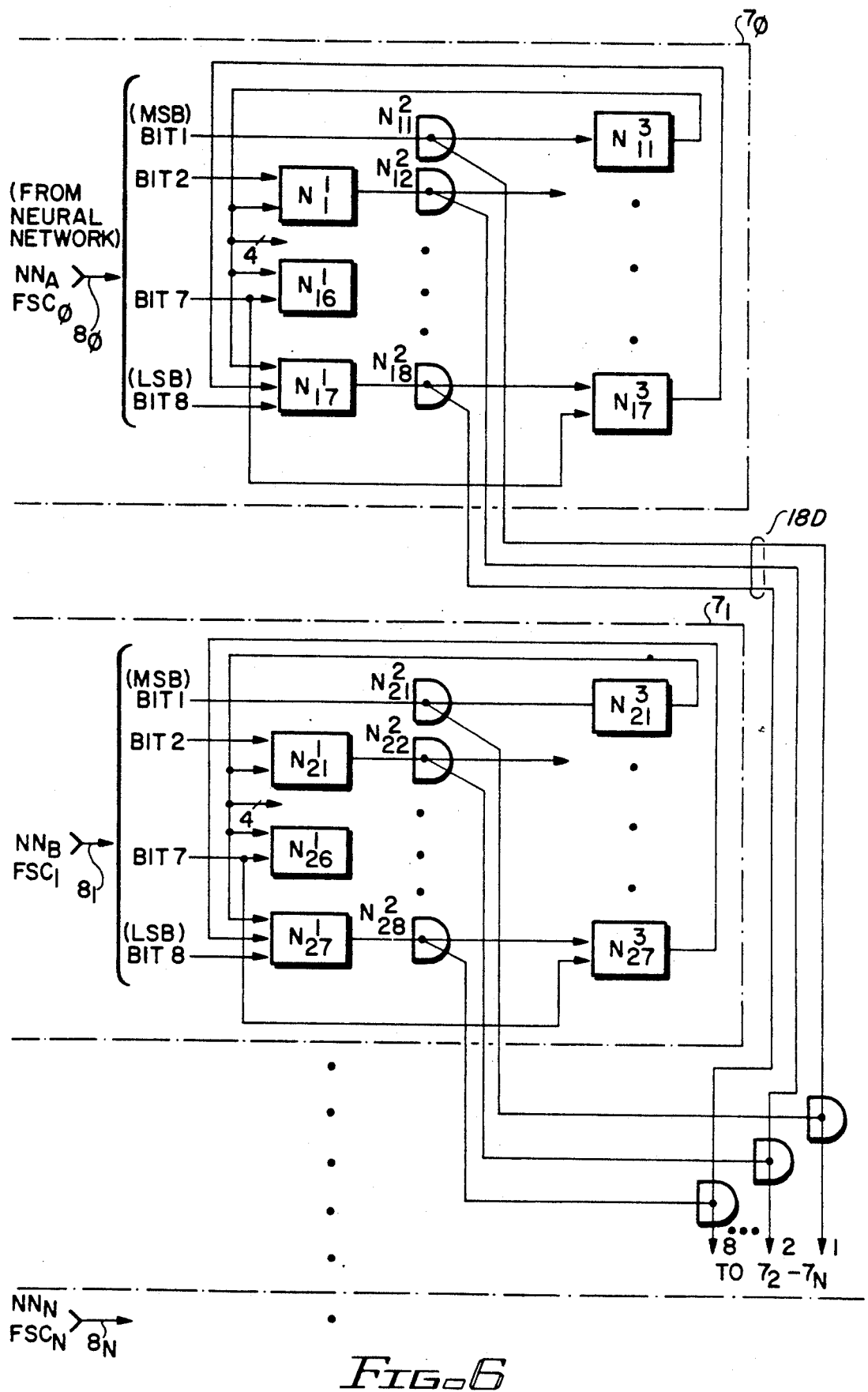
FIG. 6 is a simplified block diagram of the second neural network of FIG. 1 having an expansion bus to couple to additional fuzzy set comparators.

When multiple fuzzy set comparator devices are used having more than eight input data patterns, a second three layer neural network $7_0$, as shown in FIG. 6, is connected to the output bus 8 of the first neural network of FIG. 5. Other fuzzy set comparators $7_1$ through $7_N$ are interconnected via expansion data bus 18D. The structure of the two networks 6 and 7 is similar, and the second network identifies the lowest 16-bit result from the group of fuzzy set comparator devices. Connectivity between neurons across fuzzy set comparator devices in the second network 7 is provided through an open collector expansion bus 18D as previously discussed.

The interconnection weights of the networks are fixed at 0 or +1, so the neural networks can perform only the tasks for which they were created and cannot learn other tasks. The advantage of fixed interconnection weights for this application is the high speed parallel data processing which is achievable. Though employing positive feedback, it has been shown that these networks are stable. As any of the $2^8$ possible inputs may occur, the stable solution space for each neural network is an eight dimensional hypercube, with only stable solutions appearing at the corners of the cube.

The global neural network selects a minimum of up to 256 error values in five cycles of a 20 mHz clock, illustrating the parallel-processing nature of neural networks. The network also exhibits a reduced hardware implementation relative to more conventional approaches. Each neuron of the network may be individually deselected, thus allowing fuzzy sets with a particular range of ranking values to be grouped.

An example of a specific application of the invention is the identification of an unknown video image, such as a fingerprint, or a photograph of a person. The learned data sets would include examples of the characteristics of the subject. The subject to be identified is scanned by a video camera, the video signal digitized, and applied to the fuzzy set comparator system of the invention. The output after comparison of the input data with the pattern memory learned data will be representative of the closest stored characteristics.

The preferred implementation of the invention has been achieved in 1.5 micron CMOS technology, using about 20,000 transistors. As will now be recognized, the invention provides a postprocessing neural network for computing ranking comparisons rapidly, and allowing a device to operate in high speed applications. Although a specific implementation of the invention has been disclosed for exemplary purposes, it will be obvious to those of skill in the art to implement the invention with differing parameters and system elements without departing from the spirit and scope of the invention.

References

1 Kandel, A. "Fuzzy Mathematical Techniques with Applications", Addison-Wesley Publishing, 1986.

2 Mabuchi, S., "An Approach to the Comparison of Fuzzy Subjects with an a-Cut Dependent Index", IEEE Transactions on Systems, Man and Cybernetics, Vol. 18, No. 2, 1988.

3 Kaufmann, A., "Theory of Fuzzy Subjects", Vol. 1, Academic Press, 1975.

4 Hopfield, J., "Natural Networks and Physical Systems with Emergent Collective Computational Abilities", Proc. Nat Acad of Science, Vol 79, April 1982.

5 Widrow, B., R.G. Winter, and R.A. Baxter, "Learning Phenomena in Layered Neural Networks"., Proceedings IEEE First International Conference on Neural Networks, June 1987, pp. ii–411 through 11–429.

6 Hopfield, J., "Neurons with Graded Response have Collective Computational Properties like those of Two-State Neurons", Proc. Nat Acad of Science, Vol. 81, May 1984.

I claim:

1. A system for comparing sequentially transmitted digital data patterns with known patterns of data comprising:
    a plurality of random access memory means for storing a plurality of differing patterns of known digital data;
    a plurality of comparator means having inputs connected to each other for receiving the sequentially transmitted digital data patterns, for comparing said sequentially transmitted digital data patterns with each of said stored patterns of known data and for providing a result of said comparison;
    a plurality of accumulator means connected to respective ones of said plurality of comparator means for temporary storing the results of each of said comparisons;
    a plurality of neural network means for determining from the comparison results a network solution corresponding to the pattern of known digital data that most closely matches the sequentially transmitted digital data pattern; and
    processor means, having a preselected stored threshold, for receiving the network solution from said neural network, and outputting the network solution thereof when said network solution is less than the preselected stored threshold and providing an indication when the network solution is greater than the preselected stored threshold.

2. The system as defined in claim 1 in which said processor means includes a microprocessor.

3. The system as defined in claim 2 in which said neural network means includes a first neural network having a three layer asynchronous competitive neural network formed from logic elements.

4. The system as defined in claim 3 further comprising: an expansion bus connected to an output of said comparator means; a second neural network means having inputs connected to said expansion bus for determining a second network solution corresponding to the pattern of known digital data from said accumulator means that most closely matches the sequentially transmitted digital data pattern; and means for combining the network solution from said first neural network with the second network solution to determine a third network solution corresponding to the known data pattern that most closely matches the sequentially transmitted data pattern.

5. A system for comparing digital series input data with known patterns of such data comprising:
    (a) a central processing unit including
        (i) a microprocessor, and
        (ii) a plurality of pattern memories;
    (b) a plurality of comparators having
        (i) a first input for receiving the digital serial input data, each of said comparators having an input connected to said first input,
        (ii) a plurality of second inputs connected to each of said comparators, each of said second inputs being fed information from respective ones of said pattern memories, each of said comparators providing an output related to a comparison between data received by said first input and information fed to said second input; and
    (c) a neural network connected to each of said comparators and to said central processing unit, said neural network having means for determining which of the outputs of all of said comparators has a value less than a preselected threshold.

6. The system as defined in claim 5 further comprising:
- an A-B output from each of said comparators that outputs a result corresponding to a difference between the digital input data pattern and the known data pattern;
- a plurality of accumulators, each of said accumulators having an input connected to a respective A-B output;
- a second plurality of neural networks each having an input connected to respective ones of said accumulator's outputs, and
- a third plurality of neural networks having inputs connected to respective outputs of said second plurality of neural networks through an expansion bus.

7. A method of enhancing data in a digital bit stream comprising the steps of:
- storing a plurality of differing sets of known digital data in a plurality of pattern memories;
- comparing each frame of a received digital bit stream with each of the stored data in the pattern memories;
- generating an error value for each comparison using a comparison metric;
- accumulating the generated error values; and
- ranking the accumulated errors with values less than a preselected threshold in a neural network.

8. A system for determining the values of unknown digital data comprising:
- multiple random access memory means having inputs for receiving and storing a plurality of sets of known digital data;
- comparison means for receiving the unknown digital data and for comparing said unknown data with the stored known digital data, and including means for generating error values for each comparison of the unknown data with the known data;
- means for accumulating the error values from said comparison means;
- neural network means for finding the lowest error value in said accumulator means; and
- control processor means for receiving the lowest error value from said neural network means, for comparing such value to a stored threshold, and for outputting said value when the lowest error value is less than the stored threshold.

9. The system as defined in claim 8 in which said neural network includes an expansion bus for interconnecting outputs of said neural network to inputs of a second plurality of neural networks.

* * * * *